(12) United States Patent
Wan et al.

(10) Patent No.: US 8,234,139 B2
(45) Date of Patent: Jul. 31, 2012

(54) PROCESS MANUFACTURING WITH LEAST COST FORMULATION

(75) Inventors: Elaine Wan, San Jose, CA (US);
Thomas Daniel, Ossining, NY (US);
Rajender Nalla, Pomona, NY (US);
Graceann Iannacchino, Armonk, NY (US); Karen Theel, Sherman, CT (US)

(73) Assignee: Oracle International Corporation, Redwood Shores, CA (US)

( * ) Notice: Subject to any disclaimer, the term of this patent is extended or adjusted under 35 U.S.C. 154(b) by 814 days.

(21) Appl. No.: 11/872,448

(22) Filed: Oct. 15, 2007

(65) Prior Publication Data
US 2009/0099883 A1 Apr. 16, 2009

(51) Int. Cl.
*G06Q 10/00* (2012.01)
(52) U.S. Cl. .................. 705/7.12; 702/22; 705/7.11
(58) Field of Classification Search .............. 705/7, 1, 705/14, 10, 3; 702/2
See application file for complete search history.

(56) References Cited

U.S. PATENT DOCUMENTS

| | | | | |
|---|---|---|---|---|
| 3,443,078 A | * | 5/1969 | Noronha et al. | 708/802 |
| 3,626,377 A | * | 12/1971 | Markley | 705/3 |
| 6,532,420 B1 | * | 3/2003 | Haeffner et al. | 702/22 |
| 6,681,717 B2 | * | 1/2004 | Burghardi et al. | 119/51.02 |
| 2002/0090442 A1 | * | 7/2002 | Haeffner et al. | 426/623 |
| 2003/0195792 A1 | * | 10/2003 | Thompson et al. | 705/10 |
| 2004/0153187 A1 | * | 8/2004 | Knight et al. | 700/99 |
| 2005/0060214 A1 | * | 3/2005 | Theel et al. | 705/7 |
| 2006/0041408 A1 | * | 2/2006 | McGoogan et al. | 703/6 |
| 2006/0200320 A1 | * | 9/2006 | Al-Murrani | 702/20 |
| 2006/0242023 A1 | * | 10/2006 | Norris et al. | 705/14 |
| 2007/0192257 A1 | * | 8/2007 | Amey et al. | 705/400 |
| 2008/0038402 A1 | * | 2/2008 | Steckley et al. | 426/2 |
| 2008/0125958 A1 | * | 5/2008 | Boss et al. | 701/123 |
| 2009/0070040 A1 | * | 3/2009 | Rabinovitch et al. | 702/2 |

OTHER PUBLICATIONS

Richard Rossi, "Least cost Feed Formulation Software: An Introduction," Published 2004, Published by Aqua Feeds: Formulation and Beyond, vol. 1 Issue 3, pp. 3 to 5.*
T.O.S. Olorunfemi, "Utilization of Duckweed in least cost Feed Formulation for Broiler Starter: A linear programming Analysis," Published 2006, Published by Information Technology Journal 5(1), pp. 166-171.*
"Infor Announces the Release of Adage ERP Version 4.5," Published Apr. 25, 2005, published by www.infor.com, pp. 1 to 2 of 3.*
"Least Cost Charge Design," by Keystone Systems Inc published by web.archive.org on Jun. 6, 2004 (pp. 1-2).*
"Resource Allocation and Optimization," by Multi-Mix with Parameters—published by web.archive.org on Jun. 29, 2006 (pp. 1-4).*
"ABS Alloy Blending System," by Keystone Systems Inc, Published Oct. 2004 (pp. 1-10).*
"The Brill Formulation—Formula Control Kit all the Benefits You Need," by Feedsys.com published on Aug. 16, 2007, pp. 1-4 of 4.*
Mathews, John, H. (2005). "Module for Linear Programming—The Simplex Method," located at http://math.fullerton.edu/mathews/n2003/LinearProgrammingMod.html visited on Sep. 12, 2007. (7 pages).

* cited by examiner

*Primary Examiner* — John Hayes
*Assistant Examiner* — Brian Epstein
(74) *Attorney, Agent, or Firm* — Squire Sanders (US) LLP

(57) ABSTRACT

A system for manufacturing a product receives a formulation specification that includes a plurality of ingredients for the product. The system further receives cost information for the ingredients and inventory information. The system then generates a least cost formulation for the product based on the formulation specification, cost information and inventory information.

13 Claims, 11 Drawing Sheets

| Product | CHEESE | | LCF Product | | |
|---|---|---|---|---|---|
| Std Qty | 100.00000 | | | UOM | KGM |

Ingredients

| Item | Description | Range Type | Min | Max | UOM |
|---|---|---|---|---|---|
| CHED-60 | LCF Ingredient | Percentage | 10.00000 | 20.0000 | |
| FR-CURD | LCF Ingredient | Percentage | | | |
| DRY-WHEY | LCF Ingredient | Percentage | | | |
| CHED-90 | LCF Ingredient | Percentage | 10.00000 | 20.0000 | |
| BUTTER | LCF Ingredient | Percentage | 4.00000 | 6.0000 | |

| Parameter Composition | | | |
|---|---|---|---|
| Parameter | Description | Min Value | Max Value |
| FAT | FAT CONTENT | 10 | 40 |
| MOISTURE | MOISTURE CONTENT | 13 | 46 |
| PROTEIN | PROTEIN CONTENT | 14 | |
| LACTOSE | LACTOSE CONTENT | | 45 |
| SALT | SALT CONTENT | 2.5 | 2.5 |

Product: CHEESE    LCF Product
Std Qty: 100.00000    UOM: KGM

PROCESS MANUFACTURING WITH LEAST COST FORMULATION

FIELD OF THE INVENTION

One embodiment is directed generally to process manufacturing, and in particular to least cost formulation for process manufacturing.

BACKGROUND INFORMATION

Process manufacturing is a branch of manufacturing that is associated with formulas or manufacturing recipes, and is common in the food, beverage, chemical, pharmaceutical, consumer packaged goods and biotechnology industries. Process companies must compete in competitive markets with aggressive pricing, and typically operate under continuous pressure to be more efficient. However, process products have seasonal and regional variations that affect ingredient quality and availability. Therefore, many factors need to be considered when attempting to reduce costs while maintaining quality in process manufacturing.

SUMMARY OF THE INVENTION

One embodiment of the present invention is a system for manufacturing a product. The system receives a formulation specification that includes a plurality of ingredients for the product. The system further receives cost information for the ingredients and inventory information. The system then generates a least cost formulation for the product based on the formulation specification, cost information and inventory information.

BRIEF DESCRIPTION OF THE DRAWINGS

FIG. 3 is a graphical user interface in accordance to one embodiment to input setup technical parameters.

FIG. 4 is a graphical user interface in accordance to one embodiment to input setup technical data for a particular item or ingredient.

FIG. 7 is a graphical user interface in accordance to one embodiment of the material requirements.

FIG. 8 is a graphical user interface in accordance to one embodiment of the compositional requirements.

FIG. 9 is a graphical user interface in accordance to one embodiment of the technical requirements.

FIG. 10 is a graphical user interface in accordance to one embodiment of a material view of the least cost formulation.

FIG. 11 is a graphical user interface in accordance to one embodiment of a compositional view of the least cost formulation.

DETAILED DESCRIPTION

One embodiment is a system that determines a least cost formulation of a product based on various input parameters, including ingredient properties, ingredient costs, ingredient inventories, and target properties of the product. The system integrates the least cost formulation with a manufacturer's enterprise resource planning ("ERP") system in order to efficiently determine the formulation and to automatically generate a formula and batch for the product.

Figure 1:
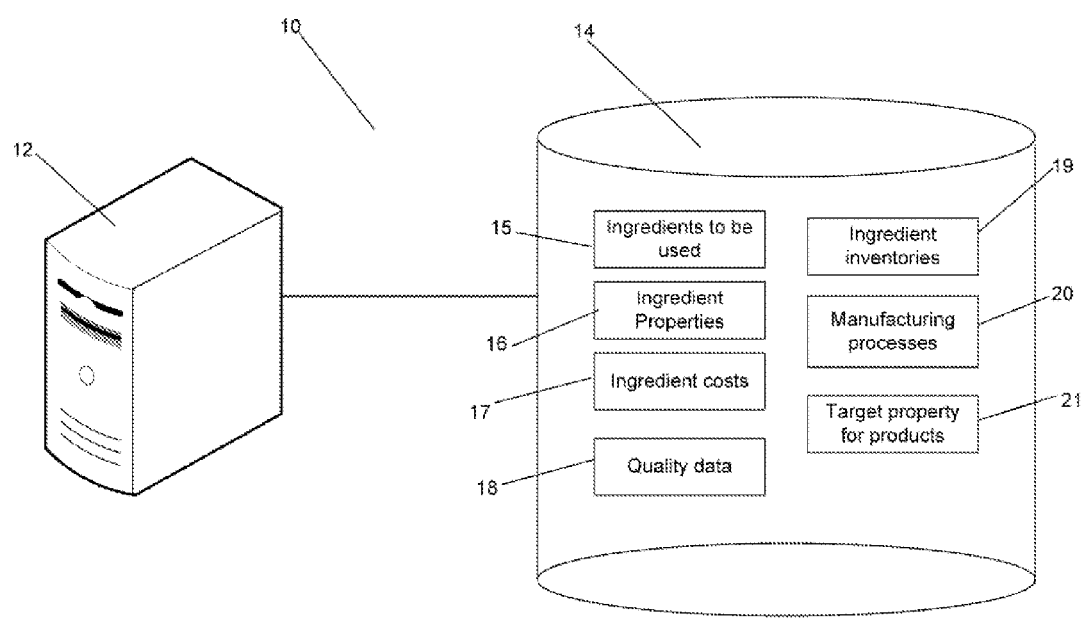
FIG. 1 is a block diagram of a system for implementing one embodiment of the present invention.

FIG. 1 is a block diagram of a system 10 for implementing one embodiment of the present invention. System 10 includes a server computer 12 coupled to a database 14. Server 12 can be any type of general purpose computer or any type of computing device that can execute instructions. Server 12 includes a processor, and memory for storing instructions that are executed by the processor. Server 12 is coupled to database 14. Server 12 can be directly coupled to database 14 or remotely coupled using any coupling method.

Database 14 provides input parameters to server 12. Database 14 can be any type of storage device, and can be part of an overall system that generates or compiles the parameters through any method. In one embodiment, database 14 and server 12 are part of an Enterprise Resource Planning ("ERP") system. In general, an ERP system integrates most or all data and processes of an organization into a unified system. A typical ERP system will use multiple components of computer software and hardware to achieve the integration. An ERP system typically includes a unified database, such as database 14, to store data for the various system modules. The system modules may include inventory, planning and scheduling, costing, approvals management, accounts payable, etc. In one embodiment, the ERP system is the "Oracle Process Manufacturing" ERP system from Oracle Corp.

In one embodiment, database 14 stores the input parameters 15-21 shown on FIG. 1 that are examples of inputs that can be used by server 12 to generate a least cost formulation. In other embodiments, additional or less input parameters are stored by database 14 and used by server 12. In addition, in other embodiments any parameter used as input by server 12 to generate the least cost formulation may be inputted by a user, generated by server 12 based on other inputs, received from another system in addition to an ERP system, or input to system 12 in any other manner.

Input parameters 15-21 in one embodiment include the ingredients 15 to be used for a formulation for a product. For example, if the formulation is for a cheese product, the ingredients may include Cheddar, curd, whey and butter. Another input parameter is the ingredient properties 16, which are the raw properties of the ingredients. For example, for a specific type of Cheddar cheese, the properties may include the fat content, moisture content, protein content, etc. The ingredient costs 17 parameter is a cost parameter that may be continually updated based on outside information coupled to database 14. Quality data 18 is data that is the result of quality testing of each ingredient. Ingredient inventories 19 is inventory levels of each ingredient. Manufacturing processes 20 are the details on how each product is manufactured. For example, for a cheese product, the manufacturing processes will specify the machinery involved and the specific manufacturing steps that are required to manufacture the cheese product. The target property 21 for products are the desired properties of the finished product, for example the overall fat content, moisture content, etc. of the manufactured cheese product.

In general, system 10 determines the least cost formulation from input parameters, such as parameters 15-21, so that target attributes, current inventory, quality results, and standard and actual costs are considered in order to create an optimum formulation for a product. The formulation can be then used in production, or maintained in a repository of formulations.

Figure 2:
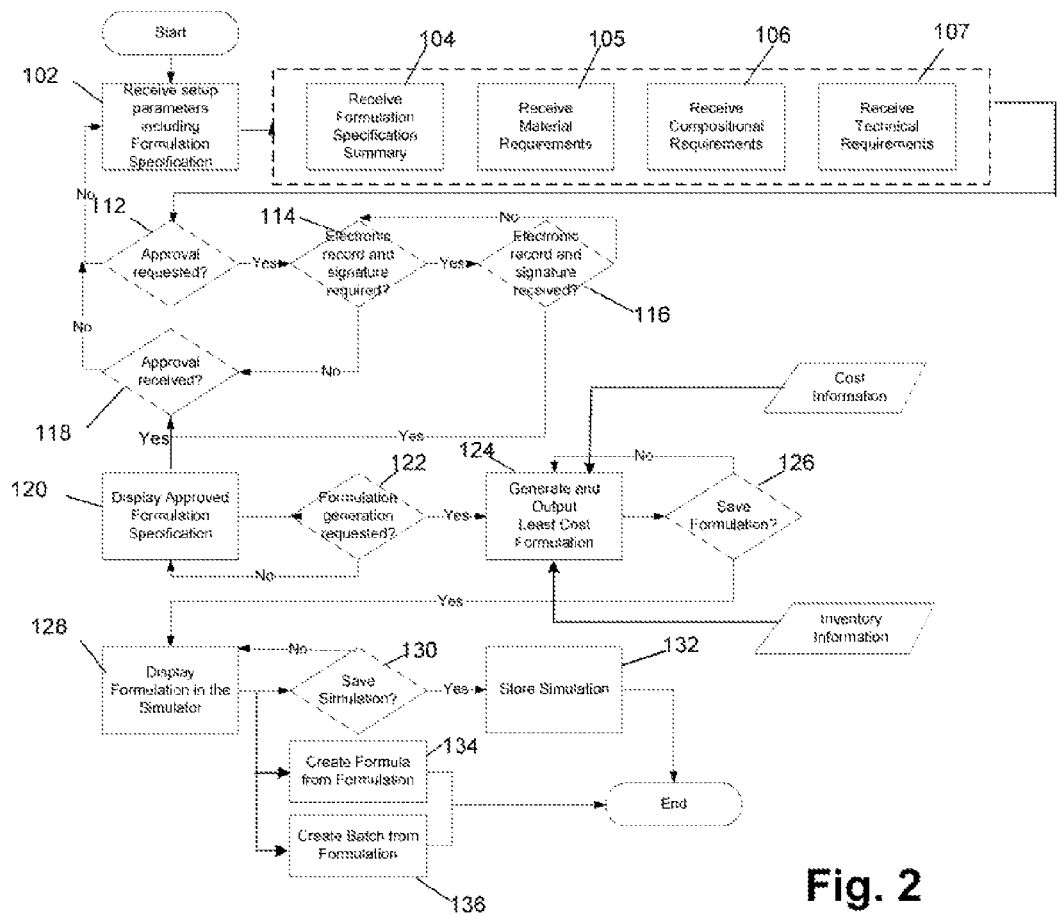
FIG. 2 is a flow diagram of the functionality of the system in accordance with one embodiment when determining a least cost formulation and, based on the least cost formulation, creating a formula or batch.

FIG. 2 is a flow diagram of the functionality of system 10 in accordance with one embodiment when determining a least cost formulation and, based on the least cost formulation, creating a formula or batch. In one embodiment, the functionality of the flow diagram of FIG. 2 is implemented by software stored in memory and executed by a processor. In other embodiments, the functionality can be performed by hardware, or any combination of hardware and software.

At 102, server 12 receives setup parameters, including a formulation specification which is comprised of formulation inputs 104-107 that function as constraints when generating the least cost formulation. The setup parameters may be received from database 14 and may be generated by an ERP system, or may be received from other sources or manually entered.

Figure 3:
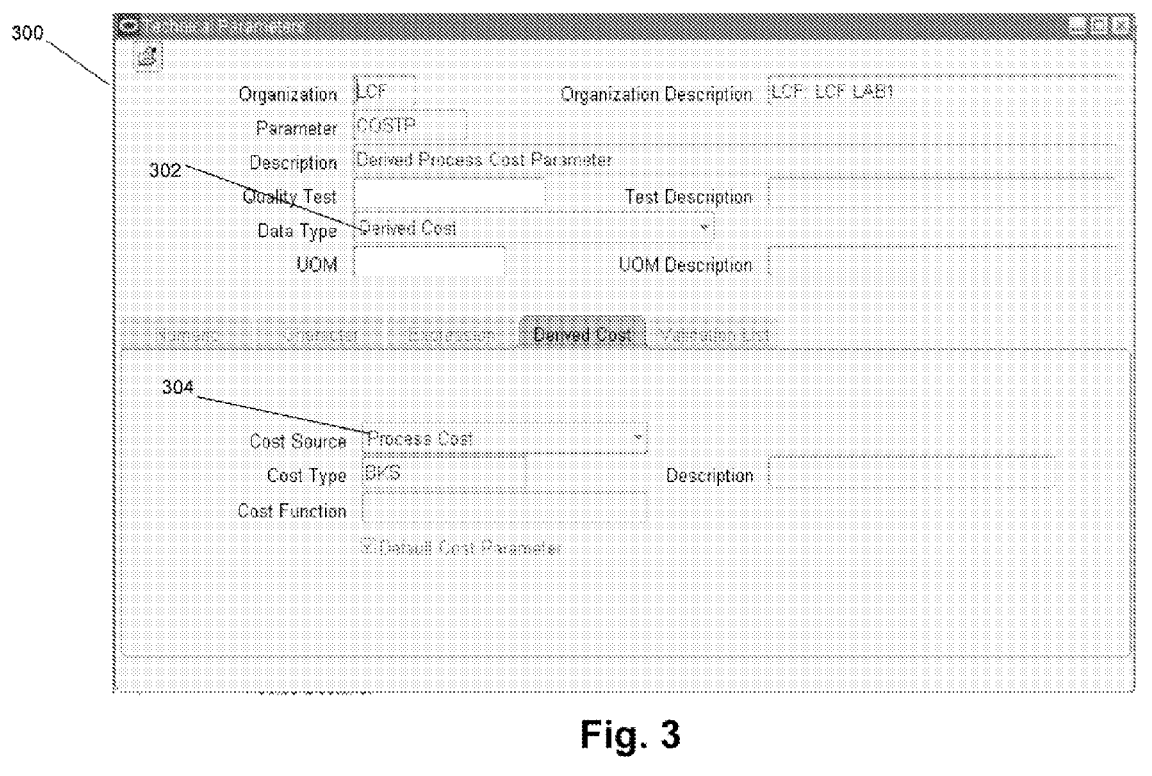

FIG. 3 is a graphical user interface 300 in accordance to one embodiment to input setup technical parameters. Technical parameters determine how various constraints, described below, are calculated for the least cost formulation. A field 302 allows "Derived Cost" to be specified, which allows technical parameters to be linked to costs. The source of the costs can be selected in field 304, and may be received from an ERP system or received from an external source.

Figure 4:
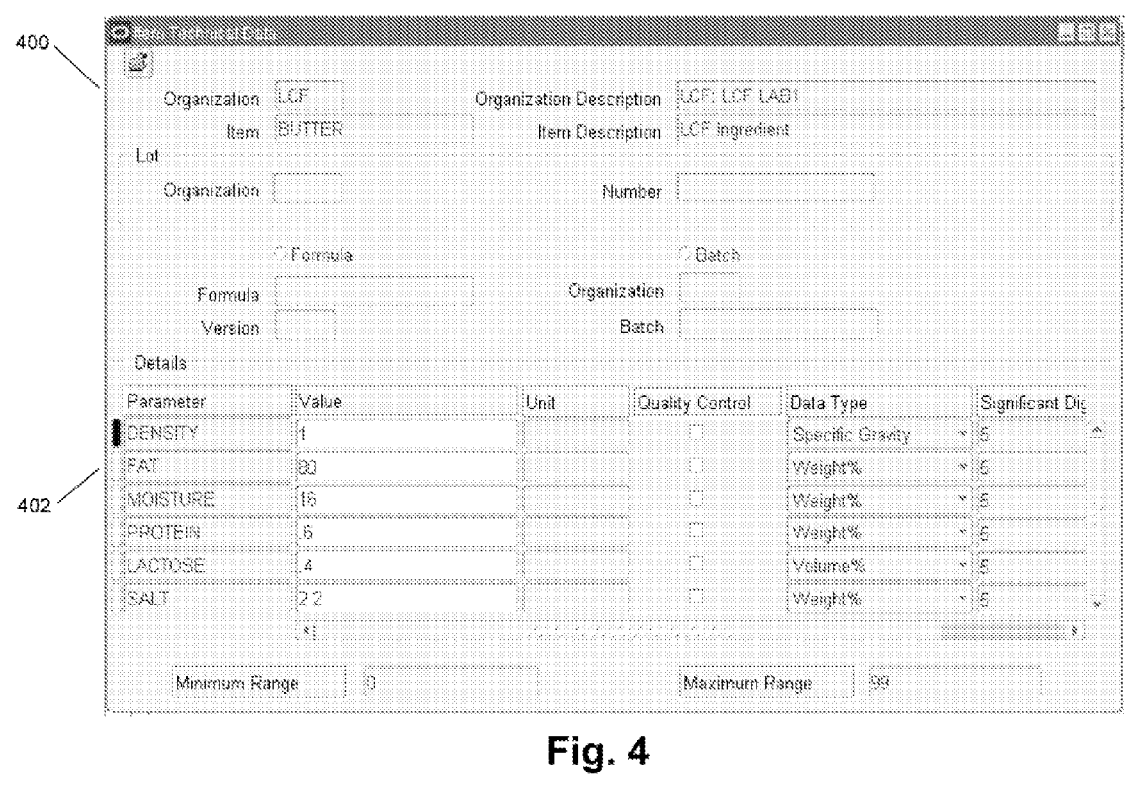

FIG. 4 is a graphical user interface 400 in accordance to one embodiment to input setup technical data for a particular item or ingredient. As shown in FIG. 4, for the ingredient of butter, technical data entered in fields 402 may include density, fat, moisture, etc. The technical data may be manually entered, may be obtained from quality testing and inspection results, or may be obtained from other areas of an ERP system.

Figure 5:
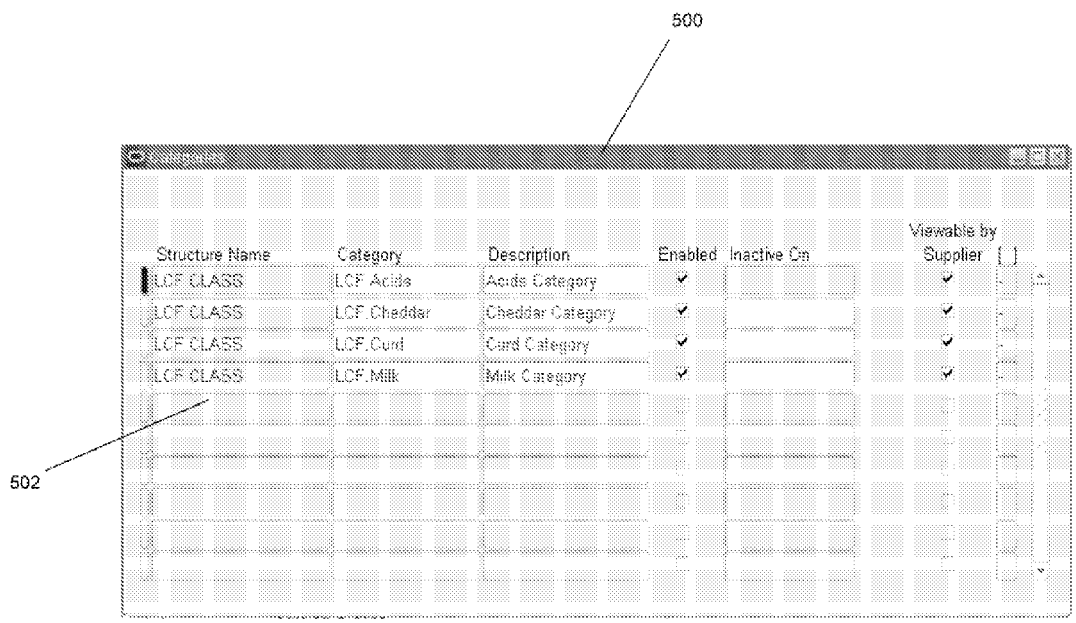
FIG. 5 is a graphical user interface in accordance to one embodiment to assign setup item categories.

FIG. 5 is a graphical user interface 500 in accordance to one embodiment to assign setup item categories. Item categories are used to define the composition of the product. Examples of an item category for a cheese product include acids, Cheddar, curd, etc., as shown in fields 502. In one embodiment, the technical data shown in FIG. 4 can be entered for each item category defined on user interface 500.

Once the setup parameters of technical parameters, item technical data and category assignments are received, the formulation specification is received. The formulation specification in one embodiment comprises a summary 104, material requirements 105, compositional requirements 106 and technical requirements 107 as shown in FIG. 2.

Figure 6:
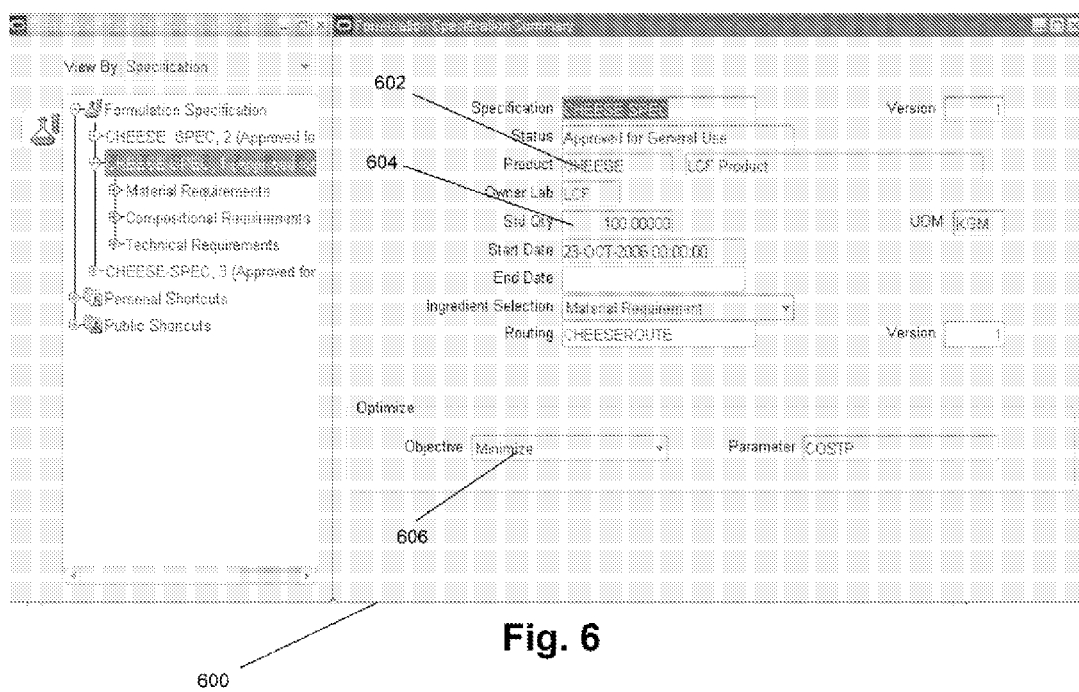
FIG. 6 is a graphical user interface in accordance to one embodiment of the formulation specification summary.

FIG. 6 is a graphical user interface 600 in accordance to one embodiment of the formulation specification summary. The formulation specification summary names the product in field 602 (e.g., cheese, fruit juice, etc.) and its standard quantity (field 604). In the objective field 606, the technical parameter that is optimized when performing least cost formulation (e.g., minimized costs) is specified.

FIG. 7 is a graphical user interface 700 in accordance to one embodiment of the material requirements. The material requirements are a list of the ingredients to make the product and their allowable quantity or percentage range. The ingredient list of interface 700 provides alternative or required ingredients based on the minimum or maximum range.

Figure 8:
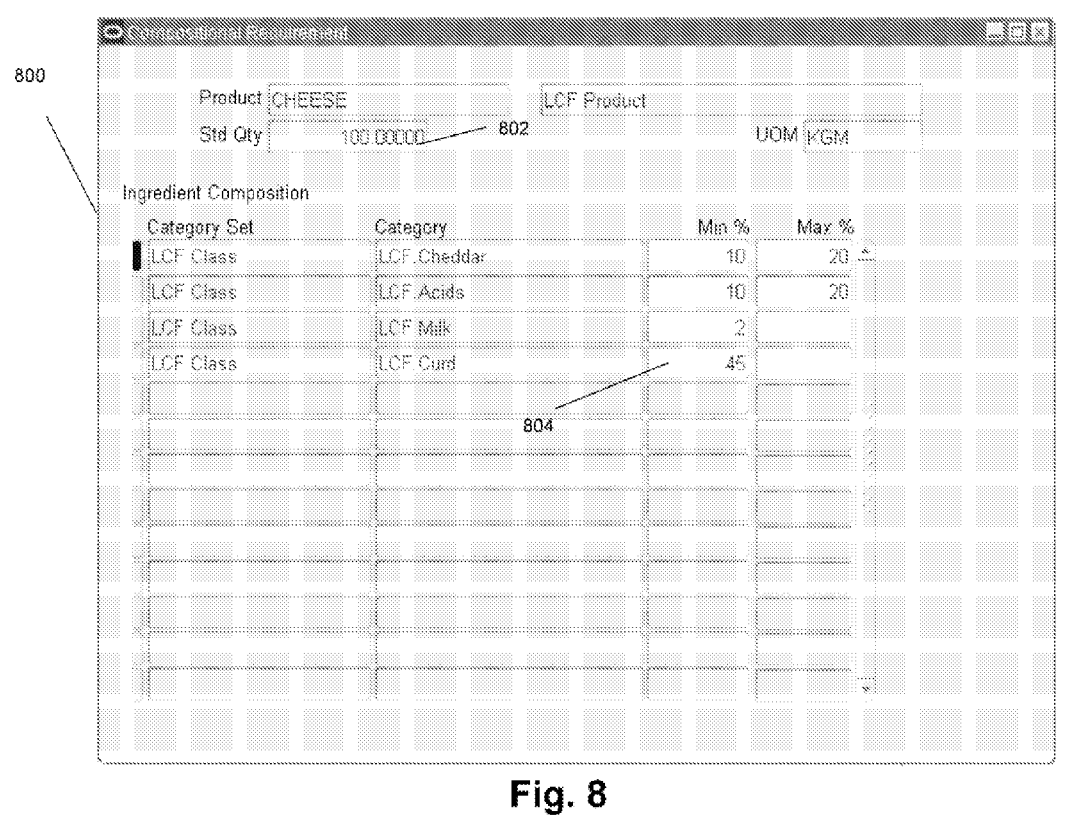

FIG. 8 is a graphical user interface 800 in accordance to one embodiment of the compositional requirements. The compositional requirements list the ingredient item groupings or categories and the percentage range. This percentage is based on the product quantity (field 802). For example, the curd category will be at least 45% (field 804) of the product quantity. So for a product quantity of 100 lbs., curd will comprise at least 45 lbs. of the cheese product.

FIG. 9 is a graphical user interface 900 in accordance to one embodiment of the technical requirements. Technical requirements list the technical parameters for the product, such as product characteristics or properties (e.g., fat percent, moisture percent, etc.) that are considered constraints when performing least cost formulation, and specify a minimum and maximum value. For example, if the lactose content of the product cannot exceed 45%, then the lactose technical parameter is entered with a minimum value of zero and a maximum value of 45 (field 902). In one embodiment, the technical requirements are limited to weight percent, volume percent, or cost or quantity per unit.

Once the setup parameters have been received and the formulation specification has been defined, as shown in FIGS. 3-9, the system determines whether the formulation specification has been approved in embodiments where approval for new formulation specifications is required. At 112 of FIG. 2, it is determined if approval has been requested. If so, at 114 it is determined whether an electronic record and signature is required and, if so, if the electronic record and signature has been received at 116. Examples of the type of person in a process manufacturing environment who would provide approval includes a Research and Development lab manager or a Product Developer. At 118, once approval has been received, the approved formulation specification is displayed at 120.

At 122, it is determined whether the least cost formulation generation is requested. If so, an optimization engine executing an algorithm determines a portion of the least cost formulation at 124. In one embodiment, the algorithm is a linear algorithm that generates the best outcome (i.e., least cost) given a list of constraints (i.e., the formulation specification, costs, etc.), using a linear mathematical model.

In one embodiment, the linear algorithm used to calculate at least part of the least cost formulation can be generalized as minimizing a linear function (i.e., least cost) $F(\vec{X})$ of n variables $\vec{x} = (x_1, x_2, \ldots, x_n)$ and in one embodiment the linear algorithm is computationally solved using a "simplex" method. The linear algorithm to be solved may be is expressed as follows:

(1) Minimize the cost $$Z = F(x_1, x_2, \ldots, x_n) = c_1 x_1 + c_2 x_2 + \ldots + c_n x_n$$

$$z = F(x_1, x_2, \ldots, x_n) = \sum_{j=1}^{n} c_j x_j \text{ where } 0 \le c_j \text{ for } j = 1, 2, \ldots, n.$$

(2) Subject to the m constraints (i.e., formulation specification, inventory, costs, etc.) $a_{i,1} x_1 + a_{i,2} x_2 + \ldots + a_{i,n} x_n \le b_i$ where $0 \le b_i$ for i=1, 2, . . . , m.

(3) With the primary constraints $0 \le x_j$ for j=1, 2, . . . , n.
The coefficients $\{c_j\}$ and $\{a_{i,j}\}$ can be any real number. It is often the case that m>n, but the cases m=n or m<n can occur.

In one embodiment, the material requirements (shown in FIG. 7) and the compositional requirements (shown in FIG. 8) that are part of the formulation specification are considered the primary constraints, and the technical requirements (shown in FIG. 9) are considered non-primary constraints or secondary constraints.

In one embodiment, initial matrices as shown in Table 1 below are set up to computational solve the least cost formulation. The first m rows consist of the coefficients matrix $(a_{i,j})_{m \times n}$, the identity matrix $I_{m \times m}$ and the column vector $(b_i)_{m,1}$. In the $(m+1)^{st}$-row of the first n elements are the coefficients $\{-c_j\}$, which are called the coefficients of the augmented objective equation. The remainder of the bottom row is filled in with zeros. An extra column on the right can be used in the decision process in solving for the variables.

TABLE 1

| Row | Decision variables | | | | | Slack variables | | | | | Right Side | Ratio's Column |
|---|---|---|---|---|---|---|---|---|---|---|---|---|
| 1 | $x_1$ | $x_2$ | $x_3$ | ... | $x_n$ | $x_{n+1}$ | $x_{n+2}$ | $x_{n+3}$ | ... | $x_{n+m}$ | $b_1$ | |
| 2 | $a_{1,1}$ | $a_{1,2}$ | $a_{1,3}$ | ... | $a_{1,n}$ | 1 | 0 | 0 | ... | 0 | $b_2$ | |
| 3 | $a_{2,1}$ | $a_{2,2}$ | $a_{2,3}$ | ... | $a_{2,n}$ | 0 | 1 | 0 | ... | 0 | $b_3$ | |
| ⋮ | $a_{3,1}$ | $a_{3,2}$ | $a_{3,3}$ | ... | $a_{3,n}$ | 0 | 0 | 1 | ... | 0 | ⋮ | |
| m | ⋮ | ⋮ | ⋮ | ⋮ | ⋮ | ⋮ | ⋮ | ⋮ | ... | ⋮ | $b_m$ | |
| m + 1 | $a_{m,1}$ | $a_{m,2}$ | $a_{m,3}$ | ... | $a_{m,n}$ | 0 | 0 | 0 | ... | 1 | 0 | |
| | $-c_1$ | $-c_2$ | $-c_3$ | ... | $-c_n$ | 0 | 0 | 0 | ... | 0 | | |

The non-negative variable $x_{n+i}$ is referred to as a "slack variable" and is the amount that the linear combination $a_{i,1}x_1 + a_{i,2}x_2 + \ldots + a_{i,n}x_n$ falls short of the bound $b_i$. The purpose of the slack variable is to change an inequality to an equation such that:

(4) $a_{i,1}x_1 + a_{i,2}x_2 + \ldots + a_{i,n}x_n + x_{n+i} = b_i$ for rows i=1, 2, ..., m in the matrices. In one embodiment, the simplex method exchanges some of the columns of 1's and 0's of the slack variables into columns of 1's and 0's of the decision variables.

In one embodiment, the following algorithm implements the simplex method:

(i) Use non-negative slack variables $x_{n+1}, x_{n+2}, \ldots, x_{n+m}$ and form a system of equations and the initial matrices.
(ii) Determine the exchange variable, the pivot row and pivotal element.

The exchange variable $x_e$ is chosen in the pivot column e where $-c_e$ is the smallest negative coefficient.

The pivot row p is chosen where the minimum ratio $$\frac{b_i}{a_{i,e}}$$

occurs for all rows with $a_{i,e} > 0$.
The pivot element is $a_{p,e}$.

(iii) Perform row operations to zero out elements in the pivotal column above and below the pivot row p.
(iv) Repeat steps (ii) and (iii) until there are no negative coefficients $-c_j$ in the bottom row.

Disclosed below is an example of the use of the simplex method to calculate at least a portion of the least cost formulation in accordance with one embodiment. In this example, the product is ice cream.

Table 2 below lists the technical parameters from FIG. 4:

TABLE 2

| Technical Parameters | | |
|---|---|---|
| Name | Data Type | Units |
| SOLIDS | Weight % | |
| BUTTER-FAT | Weight % | |
| SUGAR | Weight % | |
| COST | Derived Cost | |
| CALORIES | Weight % | |
| CARBO | Weight % | |

Table 3 below lists the item categories from FIG. 5 and the technical data for each category:

TABLE 3

| | | | Item Categories | | | | |
|---|---|---|---|---|---|---|---|
| | | | | Technical Data | | | |
| Item | Description | Category | Solids | Butter-Fat | Sugar | Calories | Carbo | Cost |
| BUTTER | BUTTER | Milk | 80 | 80 | 0 | 7.2 | 0 | 0.2 |
| BUTTERPWDR | DRY BUTTERMILK | Dry Milk | 96 | 5 | 0 | 3.6884 | 0.4784 | 0.05 |
| COCOAAD | COCOA AD | Chocolate | 95 | 10 | 0 | 0.9 | 0 | 0.03 |
| COCOACHO | COCOA, CHOCTONE | Chocolate | 100 | 0 | 0 | 0 | 0 | 0.02 |
| COCOARED | RED LABEL COCOA | Chocolate | 100 | 0 | 0 | 0 | 0 | 0.02 |
| COLOR | COLORING | Chocolate | 100 | 0 | 0 | 0 | 0 | 0.02 |
| CREAM | CREAM | Cream | 46.8 | 41 | 0 | 3.93212 | 0.02912 | 0.3 |
| CREAMBOX | BOXED CREAM | Cream | 51 | 46 | 0 | 4.33712 | 0.02912 | 0.15 |
| CREAMNZ | NZ FROZEN CREAM | Cream | 49 | 44 | 0 | 4.136 | 0.026 | 0.2 |
| CSS-45 | CORN SYR. SOLIDS 45% | Solids | 100 | 0 | 45 | 4 | 1 | 0.01 |
| EGGYOLK | POWDERED EGG YOLKS | Mix | 92 | 0 | 0 | 0 | 0 | 0.01 |
| EMPC1580 | EMULSIFIER PC 1580 | Organic | 100 | 0 | 0 | 0 | 0 | 0.01 |
| EMULSIFR | EMULSIFIER | Organic | 100 | 0 | 0 | 0 | 0 | 0.05 |
| FLAVNOG | NOG FLAVORING | Mix | 5 | 0 | 0 | 0 | 0 | 0.1 |

TABLE 3-continued

Item Categories

| Item | Description | Category | Technical Data | | | | | |
|---|---|---|---|---|---|---|---|---|
| | | | Solids | Butter-Fat | Sugar | Calories | Carbo | Cost |
| ICSTRAW | STRAWBERRY IC MIX | Mix | 37.4 | 10 | 12.7 | 2.3272 | 0.3172 | 0.1 |
| LIQCANE | LIQUID CANE SUGAR | Organic | 67.5 | 0 | 69 | 2.7 | 0.675 | 0.05 |
| LIQCORN | CORN SYRUP 36 DE | Organic | 80 | 0 | 40 | 3.2 | 0.8 | 0.04 |
| LIQFRUCT | LIQUID FRUCTOSE SYRU | Organic | 71 | 0 | 71 | 2.84 | 0.71 | 0.02 |
| MILK | WHOLE MILK | Milk | 12.4 | 3.8 | 0 | 0.64824 | 0.04524 | 0.35 |
| MILK-RET | RETURNED MILK | Milk | 12 | 3.3 | 0 | 0.60324 | 0.04524 | 0.2 |
| MIX-RET | RETURNED MIX | Mix | 12.5 | 9.5 | 0 | 0.9606 | 0.0156 | 0.1 |
| NUTMEG | NUTMEG | Mix | 92 | 0 | 0 | 0 | 0 | 0.04 |

Table 4 below lists the formulation specification summary from FIG. 6:

TABLE 4

Formulation Specification

Specification: VAN-ICECREAM Version: 1
Product: VAN-ICCM
Std.Qty: 100 UOM: LB
Start Date: 01 Jul. 2005 End Date:
Min Ing: 2 Max Ing: 8
Process Loss: 0
Ingredient Picked By: Compositional Materials
Optimize: Minimize Parameter: COST Table 5 below lists the material requirements from FIG. 7:

TABLE 5

Material Requirements

| Item | Range Type | Min | Max | UOM |
|---|---|---|---|---|
| BUTTER | Percentage | 10 | | |
| CREAM | Quantity | 4 | 12 | LBS |

Table 6 below lists the compositional requirements from FIG. 8:

TABLE 6

Compositional Requirements

| Category Set | Category | Min % | Max % |
|---|---|---|---|
| Dairy | Milk | 40 | 60 |
| Dairy | Cream | 4 | 20 |
| Dairy | Organic | 5 | 25 |
| Dairy | Mix | | |

Table 7 below lists the technical requirements from FIG. 9:

TABLE 7

Technical Requirements

| Parameter | Min % | Max % |
|---|---|---|
| Sugar | 5 | 25 |
| Calories | 4 | 12 |
| Butter-Fat | | 40 |

The system then generates constraints based on the input parameters in Tables 2-7. In this example, the standard quantity is 100 lb. As shown in Table 4, the value for "Ingredient Picked By" is "Compositional Materials" in the formulation specification. The system then chooses the materials listed in Table 8 below based on the categories listed in compositional requirements:

TABLE 8

| Sl. No | Item | Description | Category | Technical Data | | | | | |
|---|---|---|---|---|---|---|---|---|---|
| | | | | Solids | Butter-Fat | Sugar | Calories | Carbo | Cost |
| Ing1 | BUTTER | BUTTER | Milk | 80 | 80 | 0 | 7.2 | 0 | 0.2 |
| Ing2 | CREAM | CREAM | Cream | 46.8 | 41 | 0 | 3.9 | 0.02912 | 0.3 |
| Ing3 | CREAMBOX | BOXED CREAM | Cream | 51 | 46 | 0 | 4.3 | 0.02912 | 0.15 |
| Ing4 | CREAMNZ | NZ FROZEN CREAM | Cream | 49 | 44 | 0 | 4.1 | 0.026 | 0.2 |
| Ing5 | EGGYOLK | POWDERED EGG YOLKS | Mix | 92 | 0 | 0 | 0 | 0 | 0.01 |
| Ing6 | EMPC1580 | EMULSIFIER PC 1580 | Organic | 100 | 0 | 0 | 0 | 0 | 0.01 |
| Ing7 | EMULSIFR | EMULSIFIER | Organic | 100 | 0 | 0 | 0 | 0 | 0.05 |
| Ing8 | FLAVNOG | NOG FLAVORING | Mix | 5 | 0 | 0 | 0 | 0 | 0.1 |
| Ing9 | ICSTRAW | STRAWBERRY IC MIX | Mix | 37.4 | 10 | 12.7 | 2.3 | 0.3172 | 0.1 |

TABLE 8-continued

| Sl. No | Item | Description | Category | Technical Data ||||||
|---|---|---|---|---|---|---|---|---|---|
| | | | | Solids | Butter-Fat | Sugar | Calories | Carbo | Cost |
| Ing10 | LIQCANE | LIQUID CANE SUGAR | Organic | 67.5 | 0 | 69 | 2.7 | 0.675 | 0.05 |
| Ing11 | LIQCORN | CORN SYRUP 36 DE | Organic | 80 | 0 | 40 | 3.2 | 0.8 | 0.04 |
| Ing12 | LIQFRUCT | LIQUID FRUCTOSE SYRU | Organic | 71 | 0 | 71 | 2.8 | 0.71 | 0.02 |
| Ing13 | MILK | WHOLE MILK | Milk | 12.4 | 3.8 | 0 | 0.6 | 0.04524 | 0.35 |
| Ing14 | MILK-RET | RETURNED MILK | Milk | 12 | 3.3 | 0 | 0.6 | 0.04524 | 0.2 |
| Ing15 | MIX-RET | RETURNED MIX | Mix | 12.5 | 9.5 | 0 | 0.9 | 0.0156 | 0.1 |
| Ing16 | NUTMEG | NUTMEG | Mix | 92 | 0 | 0 | 0 | 0 | 0.04 |

The linear function to be minimized is then generated by the system as:

Minimize: Ing1*0.2+Ing2*0.3+Ing3*0.15+Ing4*0.2+ Ing5*0.01+Ing6*0.01+Ing7*0.05+Ing8*0.1+Ing9*0.1+ Ing10*0.05+Ing11*0.04+Ing12*0.02+Ing13*0.35+ Ing14*0.2+Ing15*0.1+Ing16*0.04

The following constraints are generated based on the material requirements of Table 5:
Ing1>=10 Lbs—(Butter: Min: 10%)
Ing2>=4—(Cream: Min Qty: 4 Lb)
Ing2<=12—(Cream: Max Qty: 4 Lb)

The following constraints are generated based on the compositional requirements of Table 6:
Ing1+Ing13>=40 Lb—(Category: Milk Min: 40%)
Ing1+Ing13<=60 Lb—(Category: Milk Max: 60%)
Ing2+Ing3+Ing4>=4 Lb—(Category: Cream Min: 4%)
Ing2+Ing3+Ing4<=20 Lb—(Category: Cream Max: 20%)
Ing6+Ing7+Ing10+Ing11+Ing12>=5 Lb—(Category: Organic Min: 5%)
Ing6+Ing7+Ing10+Ing11+Ing12<=25 Lb—(Category: Organic Max: 25%)

The following constraints are generated based on the technical requirements of Table 7:
(Parameter: Sugar Min: 5)
Ing1*0+Ing2*0+Ing3*0+Ing4*0+Ing5*0+Ing6*0+Ing7*0+ Ing8*0+Ing9*12.7+Ing10*69+Ing11*40+Ing12*71+ Ing13*0+Ing14*0+Ing15*0+Ing16*0>=500
(Parameter: Sugar Max: 25)
Ing1*0+Ing2*0+Ing3*0+Ing4*0+Ing5*0+Ing6*0+Ing7*0+ Ing8*0+Ing9*12.7+Ing10*69+Ing11*40+Ing12*71+ Ing13*0+Ing14*0+Ing15*0+Ing16*0<=2500
(Parameter: Calories Min: 4)
Ing1*7.2+Ing2*3.9+Ing3*4.3+Ing4*4.1+Ing5*0+Ing6*0+ Ing7*0+Ing8*0+Ing9*2.3+Ing10*2.7+Ing11*3.2+ Ing12*2.8+Ing13*0.6+Ing14*0.6+Ing15*0.9+ Ing16*0>=400
(Parameter: Calories Max: 12)
Ing1*7.2+Ing2*3.9+Ing3*4.3+Ing4*4.1+Ing5*0+Ing6*0+ Ing7*0+Ing8*0+Ing9*2.3+Ing10*2.7+Ing11*3.2+ Ing12*2.8+Ing13*0.6+Ing14*0.6+Ing15*0.9+ Ing16*0<=1200
(Parameter: Butter-Fat Max: 40)
Ing1*80+Ing2*41+Ing3*46+Ing4*44+Ing5*0+Ing6*0+ Ing7*0+Ing8*0+Ing9*10+Ing10*0+Ing11*0+Ing12*0+ Ing13*3.8+Ing14*3.3+Ing15*9.5+Ing16*0<=4000

Based on the above constraints, the following input matrices are generated to computationally solve the linear function using the simplex method:

| # Constraints: 14 # Structural Variables: 16 # Total Variables: (2 * 14 + 16) = 44 ||||
|---|---|---|---|
| Basic set (Decision Variables): ||||
| GW | 17. | GW+ | 100.0000 |
| I1− | 19. | I1−+ | 10.0000 |
| I2− | 21. | I2−+ | 4.0000 |
| I2+ | 23. | I2++ | 12.0000 |
| Milk− | 25. | Milk−+ | 40.0000 |
| Milk+ | 27. | Milk++ | 60.0000 |
| Cream− | 29. | Cream−+ | 4.0000 |
| Cream+ | 31. | Cream++ | 20.0000 |
| Organic− | 33. | Organic−+ | 5.0000 |
| Organic+ | 35. | Organic++ | 25.0000 |
| Sugar− | 37. | Sugar−+ | 500.0000 |
| Sugar+ | 39. | Sugar++ | 2500.0000 |
| Calories− | 41. | Calories−+ | 400.0000 |
| Calories+ | 43. | Calories++ | 1200.0000 |
| Shadow costs (Slack Variables): ||||
| 1. | I1 | 0.2000 | True |
| 2. | I2 | 0.3000 | True |
| 3. | I3 | 0.1500 | True |
| 4. | I4 | 0.2000 | True |
| 5. | I5 | 0.0100 | True |
| 6. | I6 | 0.0100 | True |
| 7. | I7 | 0.0500 | True |

-continued

| | # Constraints: 14 # Structural Variables: 16 # Total Variables: (2 * 14 + 16) = 44 | | |
|---|---|---|---|
| 8. | I8 | 0.1000 | True |
| 9. | I9 | 0.1000 | True |
| 10. | I10 | 0.0500 | True |
| 11. | I11 | 0.0400 | True |
| 12. | I12 | 0.0200 | True |
| 13. | I13 | 0.3500 | True |
| 14. | I14 | 0.2000 | True |
| 15. | I15 | 0.1000 | True |
| 16. | I16 | 0.0400 | True |
| 17. | GW+ | 0.0000 | False |
| 18. | GW− | 0.0000 | False |
| 19. | I1−+ | 0.0000 | False |
| 20. | I1−− | 0.0000 | True |
| 21. | I2−+ | 0.0000 | False |
| 22. | I2−− | 0.0000 | True |
| 23. | I2++ | 0.0000 | True |
| 24. | I2+− | 0.0000 | False |
| 25. | Milk−+ | 0.0000 | False |
| 26. | Milk−− | 0.0000 | True |
| 27. | Milk++ | 0.0000 | True |
| 28. | Milk+− | 0.0000 | False |
| 29. | Cream−+ | 0.0000 | False |
| 30. | Cream−− | 0.0000 | True |
| 31. | Cream++ | 0.0000 | True |
| 32. | Cream+− | 0.0000 | False |
| 33. | Organic−+ | 0.0000 | False |
| 34. | Organic−− | 0.0000 | True |
| 35. | Organic++ | 0.0000 | True |
| 36. | Organic+− | 0.0000 | False |
| 37. | Sugar−+ | 0.0000 | False |
| 38. | Sugar−− | 0.0000 | True |
| 39. | Sugar++ | 0.0000 | True |
| 40. | Sugar+− | 0.0000 | False |
| 41. | Calories−+ | 0.0000 | False |
| 42. | Calories−− | 0.0000 | True |
| 43. | Calories++ | 0.0000 | True |
| 44. | Calories+− | 0.0000 | False |

Matrix:

| 0 | 0.0000 | 0.2000 | 0.3000 | 0.1500 | 0.2000 | 0.0100 | 0.0100 | 0.0500 | 0.1000 | 0.1000 |
|---|---|---|---|---|---|---|---|---|---|---|
| | 0.0500 | 0.0400 | 0.0200 | 0.3500 | 0.2000 | 0.1000 | 0.0400 | 0.0000 | 0.0000 | 0.0000 |
| | 0.0000 | 0.0000 | 0.0000 | 0.0000 | 0.0000 | 0.0000 | 0.0000 | 0.0000 | 0.0000 | 0.0000 |
| | 0.0000 | 0.0000 | 0.0000 | 0.0000 | 0.0000 | 0.0000 | 0.0000 | 0.0000 | 0.0000 | 0.0000 |
| | 0.0000 | 0.0000 | | | | | | | | |
| 1 | 100.0000 | 1.0000 | 1.0000 | 1.0000 | 1.0000 | 1.0000 | 1.0000 | 1.0000 | 1.0000 | 1.0000 |
| | 1.0000 | 1.0000 | 1.0000 | 1.0000 | 1.0000 | 1.0000 | 1.0000 | −1.0000 | 0.0000 | 0.0000 |
| | 0.0000 | 0.0000 | 0.0000 | 0.0000 | 0.0000 | 0.0000 | 0.0000 | 0.0000 | 0.0000 | 0.0000 |
| | 0.0000 | 0.0000 | 0.0000 | 0.0000 | 0.0000 | 0.0000 | 0.0000 | 0.0000 | 0.0000 | 0.0000 |
| | 0.0000 | 0.0000 | | | | | | | | |
| 2 | 10.0000 | 1.0000 | 0.0000 | 0.0000 | 0.0000 | 0.0000 | 0.0000 | 0.0000 | 0.0000 | 0.0000 |
| | 0.0000 | 0.0000 | 0.0000 | 0.0000 | 0.0000 | 0.0000 | 0.0000 | 0.0000 | 1.0000 | −1.0000 |
| | 0.0000 | 0.0000 | 0.0000 | 0.0000 | 0.0000 | 0.0000 | 0.0000 | 0.0000 | 0.0000 | 0.0000 |
| | 0.0000 | 0.0000 | 0.0000 | 0.0000 | 0.0000 | 0.0000 | 0.0000 | 0.0000 | 0.0000 | 0.0000 |
| | 0.0000 | 0.0000 | | | | | | | | |
| 3 | 4.0000 | 0.0000 | 1.0000 | 0.0000 | 0.0000 | 0.0000 | 0.0000 | 0.0000 | 0.0000 | 0.0000 |
| | 0.0000 | 0.0000 | 0.0000 | 0.0000 | 0.0000 | 0.0000 | 0.0000 | 0.0000 | 0.0000 | 0.0000 |
| | 1.0000 | −1.0000 | 0.0000 | 0.0000 | 0.0000 | 0.0000 | 0.0000 | 0.0000 | 0.0000 | 0.0000 |
| | 0.0000 | 0.0000 | 0.0000 | 0.0000 | 0.0000 | 0.0000 | 0.0000 | 0.0000 | 0.0000 | 0.0000 |
| | 0.0000 | 0.0000 | | | | | | | | |
| 4 | 12.0000 | 0.0000 | 1.0000 | 0.0000 | 0.0000 | 0.0000 | 0.0000 | 0.0000 | 0.0000 | 0.0000 |
| | 0.0000 | 0.0000 | 0.0000 | 0.0000 | 0.0000 | 0.0000 | 0.0000 | 0.0000 | 0.0000 | 0.0000 |
| | 0.0000 | 0.0000 | 1.0000 | −1.0000 | 0.0000 | 0.0000 | 0.0000 | 0.0000 | 0.0000 | 0.0000 |
| | 0.0000 | 0.0000 | 0.0000 | 0.0000 | 0.0000 | 0.0000 | 0.0000 | 0.0000 | 0.0000 | 0.0000 |
| | 0.0000 | 0.0000 | | | | | | | | |
| 5 | 40.0000 | 1.0000 | 0.0000 | 0.0000 | 0.0000 | 0.0000 | 0.0000 | 0.0000 | 0.0000 | 0.0000 |
| | 0.0000 | 0.0000 | 0.0000 | 1.0000 | 0.0000 | 0.0000 | 0.0000 | 0.0000 | 0.0000 | 0.0000 |
| | 0.0000 | 0.0000 | 0.0000 | 0.0000 | 1.0000 | −1.0000 | 0.0000 | 0.0000 | 0.0000 | 0.0000 |
| | 0.0000 | 0.0000 | 0.0000 | 0.0000 | 0.0000 | 0.0000 | 0.0000 | 0.0000 | 0.0000 | 0.0000 |
| | 0.0000 | 0.0000 | | | | | | | | |
| 6 | 60.0000 | 1.0000 | 0.0000 | 0.0000 | 0.0000 | 0.0000 | 0.0000 | 0.0000 | 0.0000 | 0.0000 |
| | 0.0000 | 0.0000 | 0.0000 | 1.0000 | 0.0000 | 0.0000 | 0.0000 | 0.0000 | 0.0000 | 0.0000 |
| | 0.0000 | 0.0000 | 0.0000 | 0.0000 | 0.0000 | 0.0000 | 1.0000 | −1.0000 | 0.0000 | 0.0000 |
| | 0.0000 | 0.0000 | 0.0000 | 0.0000 | 0.0000 | 0.0000 | 0.0000 | 0.0000 | 0.0000 | 0.0000 |
| | 0.0000 | 0.0000 | | | | | | | | |
| 7 | 4.0000 | 0.0000 | 1.0000 | 1.0000 | 1.0000 | 0.0000 | 0.0000 | 0.0000 | 0.0000 | 0.0000 |
| | 0.0000 | 0.0000 | 0.0000 | 0.0000 | 0.0000 | 0.0000 | 0.0000 | 0.0000 | 0.0000 | 0.0000 |
| | 0.0000 | 0.0000 | 0.0000 | 0.0000 | 0.0000 | 0.0000 | 0.0000 | 0.0000 | 1.0000 | −1.0000 | 0.0000 |

-continued

| # Constraints: 14 # Structural Variables: 16 # Total Variables: (2 * 14 + 16) = 44 | | | | | | | | | | |
|---|---|---|---|---|---|---|---|---|---|---|
| 0.0000 | 0.0000 | 0.0000 | 0.0000 | 0.0000 | 0.0000 | 0.0000 | 0.0000 | 0.0000 | 0.0000 | 0.0000 |
| 0.0000 | 0.0000 | | | | | | | | | |
| 8 | 20.0000 | 0.0000 | 1.0000 | 1.0000 | 1.0000 | 0.0000 | 0.0000 | 0.0000 | 0.0000 | 0.0000 |
| 0.0000 | 0.0000 | 0.0000 | 0.0000 | 0.0000 | 0.0000 | 0.0000 | 0.0000 | 0.0000 | 0.0000 | 0.0000 |
| 0.0000 | 0.0000 | 0.0000 | 0.0000 | 0.0000 | 0.0000 | 0.0000 | 0.0000 | 0.0000 | 0.0000 | 1.0000 |
| −1.0000 | 0.0000 | 0.0000 | 0.0000 | 0.0000 | 0.0000 | 0.0000 | 0.0000 | 0.0000 | 0.0000 | 0.0000 |
| 0.0000 | 0.0000 | | | | | | | | | |
| 9 | 5.0000 | 0.0000 | 0.0000 | 0.0000 | 0.0000 | 0.0000 | 1.0000 | 1.0000 | 0.0000 | 0.0000 |
| 1.0000 | 1.0000 | 1.0000 | 0.0000 | 0.0000 | 0.0000 | 0.0000 | 0.0000 | 0.0000 | 0.0000 | 0.0000 |
| 0.0000 | 0.0000 | 0.0000 | 0.0000 | 0.0000 | 0.0000 | 0.0000 | 0.0000 | 0.0000 | 0.0000 | 0.0000 |
| 0.0000 | 1.0000 | −1.0000 | 0.0000 | 0.0000 | 0.0000 | 0.0000 | 0.0000 | 0.0000 | 0.0000 | 0.0000 |
| 0.0000 | 0.0000 | | | | | | | | | |
| 10 | 25.0000 | 0.0000 | 0.0000 | 0.0000 | 0.0000 | 0.0000 | 1.0000 | 1.0000 | 0.0000 | 0.0000 |
| 1.0000 | 1.0000 | 1.0000 | 0.0000 | 0.0000 | 0.0000 | 0.0000 | 0.0000 | 0.0000 | 0.0000 | 0.0000 |
| 0.0000 | 0.0000 | 0.0000 | 0.0000 | 0.0000 | 0.0000 | 0.0000 | 0.0000 | 0.0000 | 0.0000 | 0.0000 |
| 0.0000 | 0.0000 | 0.0000 | 1.0000 | −1.0000 | 0.0000 | 0.0000 | 0.0000 | 0.0000 | 0.0000 | 0.0000 |
| 0.0000 | 0.0000 | | | | | | | | | |
| 11 | 500.0000 | 0.0000 | 0.0000 | 0.0000 | 0.0000 | 0.0000 | 0.0000 | 0.0000 | 0.0000 | 12.7000 |
| 69.0000 | 40.0000 | 71.0000 | 0.0000 | 0.0000 | 0.0000 | 0.0000 | 0.0000 | 0.0000 | 0.0000 | 0.0000 |
| 0.0000 | 0.0000 | 0.0000 | 0.0000 | 0.0000 | 0.0000 | 0.0000 | 0.0000 | 0.0000 | 0.0000 | 0.0000 |
| 0.0000 | 0.0000 | 0.0000 | 0.0000 | 0.0000 | 1.0000 | −1.0000 | 0.0000 | 0.0000 | 0.0000 | 0.0000 |
| 0.0000 | 0.0000 | | | | | | | | | |
| 12 | 2500.0000 | 0.0000 | 0.0000 | 0.0000 | 0.0000 | 0.0000 | 0.0000 | 0.0000 | 0.0000 | 12.7000 |
| 69.0000 | 40.0000 | 71.0000 | 0.0000 | 0.0000 | 0.0000 | 0.0000 | 0.0000 | 0.0000 | 0.0000 | 0.0000 |
| 0.0000 | 0.0000 | 0.0000 | 0.0000 | 0.0000 | 0.0000 | 0.0000 | 0.0000 | 0.0000 | 0.0000 | 0.0000 |
| 0.0000 | 0.0000 | 0.0000 | 0.0000 | 0.0000 | 0.0000 | 0.0000 | 1.0000 | −1.0000 | 0.0000 | 0.0000 |
| 0.0000 | 0.0000 | | | | | | | | | |
| 13 | 400.0000 | 7.2000 | 3.9000 | 4.3000 | 4.1000 | 0.0000 | 0.0000 | 0.0000 | 0.0000 | 2.3000 |
| 2.7000 | 3.2000 | 2.8000 | 0.6000 | 0.6000 | 0.9000 | 0.0000 | 0.0000 | 0.0000 | 0.0000 | 0.0000 |
| 0.0000 | 0.0000 | 0.0000 | 0.0000 | 0.0000 | 0.0000 | 0.0000 | 0.0000 | 0.0000 | 0.0000 | 0.0000 |
| 0.0000 | 0.0000 | 0.0000 | 0.0000 | 0.0000 | 0.0000 | 0.0000 | 0.0000 | 0.0000 | 1.0000 | −1.0000 |
| 0.0000 | 0.0000 | | | | | | | | | |
| 14 | 1200.0000 | 7.2000 | 3.9000 | 4.3000 | 4.1000 | 0.0000 | 0.0000 | 0.0000 | 0.0000 | 2.3000 |
| 2.7000 | 3.2000 | 2.8000 | 0.6000 | 0.6000 | 0.9000 | 0.0000 | 0.0000 | 0.0000 | 0.0000 | 0.0000 |
| 0.0000 | 0.0000 | 0.0000 | 0.0000 | 0.0000 | 0.0000 | 0.0000 | 0.0000 | 0.0000 | 0.0000 | 0.0000 |
| 0.0000 | 0.0000 | 0.0000 | 0.0000 | 0.0000 | 0.0000 | 0.0000 | 0.0000 | 0.0000 | 0.0000 | 0.0000 |
| 1.0000 | −1.0000 | | | | | | | | | |
| 15 | 0.0000 | 0.0000 | 0.0000 | 0.0000 | 0.0000 | 0.0000 | 0.0000 | 0.0000 | 0.0000 | 0.0000 |
| 0.0000 | 0.0000 | 0.0000 | 0.0000 | 0.0000 | 0.0000 | 0.0000 | 0.0000 | 0.0000 | 0.0000 | 0.0000 |
| 0.0000 | 0.0000 | 0.0000 | 0.0000 | 0.0000 | 0.0000 | 0.0000 | 0.0000 | 0.0000 | 0.0000 | 0.0000 |
| 0.0000 | 0.0000 | 0.0000 | 0.0000 | 0.0000 | 0.0000 | 0.0000 | 0.0000 | 0.0000 | 0.0000 | 0.0000 |
| 0.0000 | 0.0000 | | | | | | | | | |

The solution of the input matrices, which is the system generated suggestion of the ingredient compositions that achieve the least cost and satisfy all of the requirements, is shown in Table 9 below:

TABLE 9

| | | | | Technical Data | | | | | |
|---|---|---|---|---|---|---|---|---|---|
| Sl. No | Item | Qty | Category | Solids | Butter-Fat | Sugar | Calories | Carbo | Cost |
| Ing1 | BUTTER | 43.66667 | Milk | 80 | 80 | 0 | 7.2 | 0 | 0.2 |
| Ing2 | CREAM | 4 | Cream | 46.8 | 41 | 0 | 3.9 | 0.02912 | 0.3 |
| Ing5 | EGGYOLK | 27.33333 | Mix | 92 | 0 | 0 | 0 | 0 | 0.01 |
| Ing12 | LIQFRUCT | 25 | Organic | 71 | 0 | 71 | 2.8 | 0.71 | 0.02 |
| Product | VAN-ICCM | 100 | | 79.702 | 36.57 | 17.75 | 4 | 0.17 | 0.11 |

In one embodiment, after the linear function is minimized by solving the matrices using the simplex method, a list of ingredient compositions is generated as in Table 9. The list includes a quantity suggested for each ingredient. In an embodiment, where a unified database of an ERP system is used to store inventory levels and associated costs, the system queries the database in order to fetch inventory "lots" or portions in order to form the determined quantity. Each lot may have a different cost associated with it depending on its purchase date Once the lots are fetched, the system checks the lot level costs to verify that they fall within the item cost range. It also verifies that the lot level technical attributes match the technical requirements. If there are disparities, the least cost formulation is recalculated with revised parameters and constraints.

The least cost formulation is derived at least in part from a list of alternative ingredients based on optimization of cost and other technical or quality parameters, product target attributes and material constraints. The least cost formulation can be generated on-the-fly for a specific purpose (e.g. a week) and uses current cost information and inventory information as well as other parameters.

One advantage of generating the least cost formulation based on ERP data and other data not typically considered is that the most current information of the manufacturing facility will be used at the time of the generation. For example, if butter is one of the ingredients, the determination of least cost formulation at 124 of FIG. 3 can take into account the current price of various available alternative butters that can be used and the current inventory level of the butters as just two of many input factors.

Figure 10:
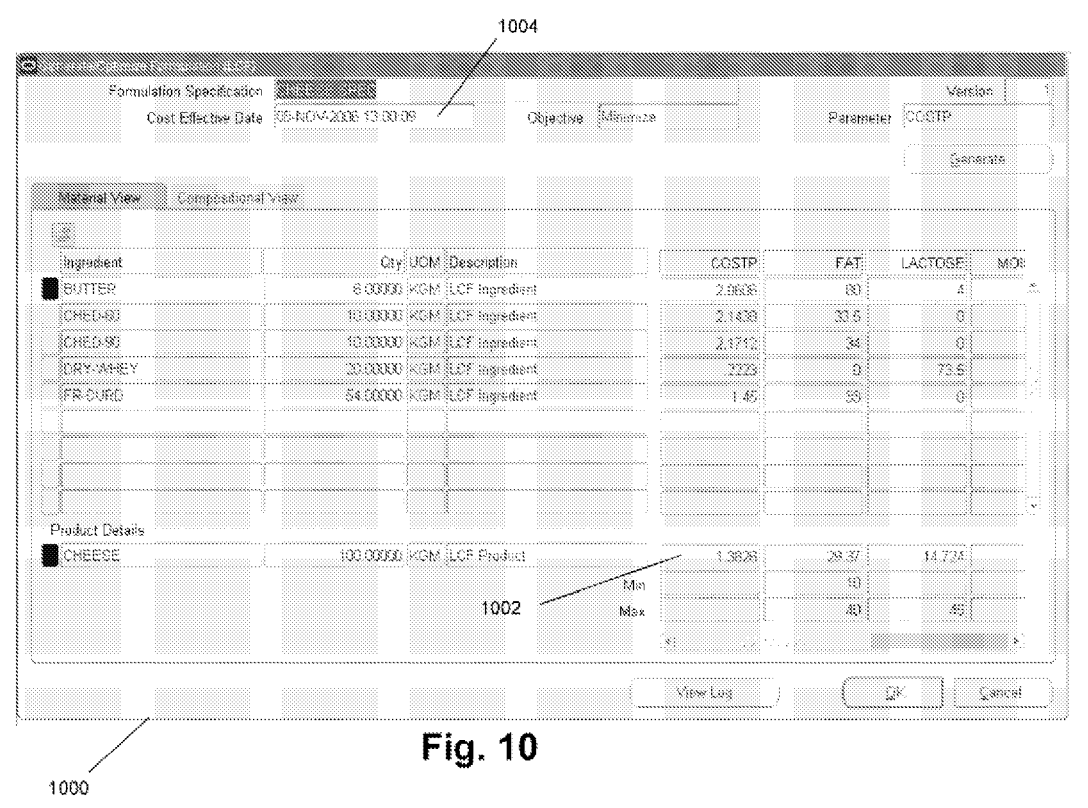

Once the least cost formulation is generated at 124, it can be viewed and manipulated. FIG. 10 is a graphical user interface 1000 in accordance to one embodiment of a material view of the least cost formulation. The material view of the formulation lists each ingredient, along with the ingredient quantity and technical data for each of the ingredients. In addition, technical data for the final product is displayed (fields 1002). A cost effective date is specified (field 1004) so that the calculated costs are based on relevant costing information.

Figure 11:
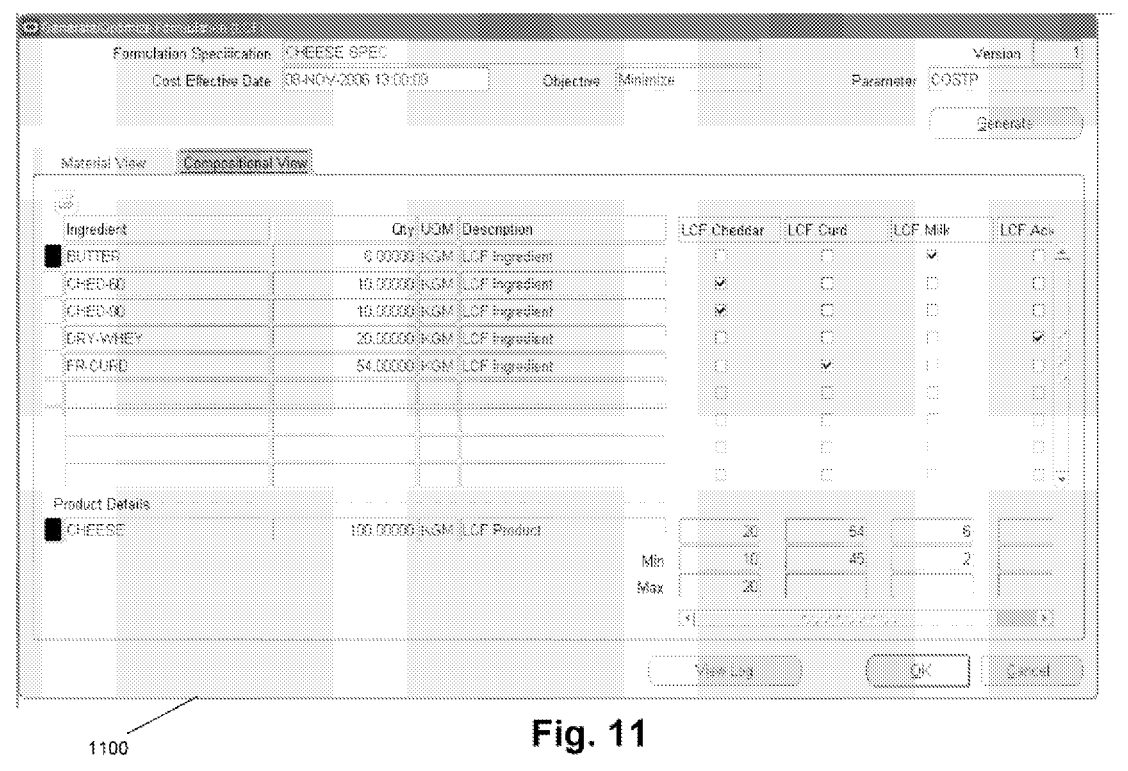

FIG. 11 is a graphical user interface 1100 in accordance to one embodiment of a compositional view of the least cost formulation. The compositional view of the formulation shows the ingredients and their assigned item category, and how each ingredient contributes to the categories.

Referring again to FIG. 2, at 126 it is determined whether to save the formulation or return to 124 and output the least cost formulation again, possibly after changing some input parameters or constraints.

If the least cost formulation has been saved, at 128 it may be displayed and simulated by a simulator tool which predicts the properties of the product if it was to manufactured using the formulation. One example of a simulator tool that can be used at 128 is the simulator tool in the "Oracle Process Manufacturing" ERP system from Oracle Corp. In one embodiment, the simulator tool provides the ability to see the impact of different ingredients on a product's total output and allows the selection of alternate items and running of laboratory batch simulations using actual lots and quality results.

At 130, the formulation can be modified and further simulated again at 128, until the user is satisfied that the system has generated an acceptable formulation. At 132 the simulation is saved.

At 134 a formula is automatically created from the least cost formulation taking account all necessary parameters from the ERP system or other sources. A formula, in general, is a recipe template on how to make the product, including the ingredients used, proportions of ingredients, etc.

At 136, a batch is automatically created from the least cost formulation taking account all necessary parameters from the ERP system or other sources. A batch, in general, specifies the execution steps and bill of materials for manufacturing the product.

As disclosed, embodiments generate a least cost formulation using inputs from an overall process manufacturing environment that may be stored in a manufacturer's ERP system. For process manufacturers that rely heavily on the blending of ingredients or primarily use commodities as the basis for their products, variable characteristics and costs found in the raw materials can be taken into account in order to produce a consistent, high-quality product. From the least cost formulation, price-optimal formulas and batches are automatically generated based on product specifications for material, compositional, and quality requirements for regulatory, nutritional, or chemical content, and other industry or customer-specific attributes. The optimal mix is achieved by analyzing ingredient characteristics, up-to-date prices, and the product specification. As a result, a product can be efficiently manufactured leading to a reduction of manufacturing costs, an increase in inventory utilization and an improvement in purchasing and planning decisions.

Several embodiments are specifically illustrated and/or described herein. However, it will be appreciated that modifications and variations of are covered by the above teachings and within the purview of the appended claims without departing from the spirit and intended scope of the invention.

What is claimed is:

1. A method of manufacturing a product comprising:
    receiving, at a server, a formulation specification, wherein the formulation specification comprises a plurality of ingredients for the product and technical requirements;
    receiving, at the server, cost information for the ingredients;
    receiving, at the server, inventory information for the ingredients;
    generating, at the server, a least cost formulation for the product based on the formulation specification, cost information and inventory information;
    wherein the generating the least cost formulation comprises minimizing a linear function;
    wherein the minimized linear function comprises a plurality of quantities for a plurality of ingredients;
    fetching, at the server, at least two inventory lots for each quantity in order to form each quantity, wherein the at least two inventory lots have an associated cost that is based on a purchase date;
    determining, at the server, whether the cost of the at least two inventory lots falls within a generated cost range;
    verifying, at the server, that technical attributes of the at least two inventory lots match the technical requirements of the formulation specification;
    after the linear function is minimized, recalculating, at the server, the least cost formulation when the technical attributes of the at least two inventory lots do not match the technical requirements of the formulation specification; and
    after the linear function is minimized, recalculating, at the server, the least cost formulation when the cost of the at least two inventory lots does not fall within the generated cost range.

2. The method of claim 1, further comprising generating a formula for the product based on the least cost formulation.

3. The method of claim 1, further comprising generating a batch for the product based on the least cost formulation.

4. The method of claim 2, wherein the cost information and inventory information is received from an Enterprise Resource Planning system.

5. The method of claim 1, wherein the formulation specification comprises alternative ingredients for the product.

6. The method of claim 1, wherein the formulation specification comprises compositional requirements.

7. The method of claim 1, further comprising simulating the least cost formulation.

8. The method of claim 1, wherein the least cost formulation is further based on quality data for the ingredients.

9. The method of claim 1, wherein the linear function is minimized using a simplex method, and wherein the simplex method comprises primary constraints and secondary constraints, and the primary constraints comprise compositional requirements and the secondary constraints comprise technical requirements.

10. A system for process manufacturing a product comprising:
- a processor; and
- a database coupled to the processor;
- wherein the processor is configured to receive a formulation specification that comprises a plurality of ingredients for the product and technical requirements, receive cost information for the ingredients, and receive inventory information for the ingredients, and generate a least cost formulation for the product based on the formulation specification and cost information;
- wherein the processor is further configured to minimize a linear function;
- wherein the minimized linear function comprises a plurality of quantities for a plurality of ingredients;
- wherein the processor is further configured to fetch at least two inventory lots for each quantity in order to form each quantity, wherein the at least two inventory lots have an associated cost that is based on a purchase date;
- wherein the processor is further configured to determine whether a cost of the at least two inventory lots falls within a generated cost range;
- wherein the processor is further configured to verify that technical attributes of the at least two inventory lots match the technical requirements of the formulation specification;
- wherein the processor is further configured, after the linear function is minimized, to recalculate the least cost formulation when the technical attributes of the at least two inventory lots do not match the technical requirements of the formulation specification; and
- wherein the processor is further configured, after the linear function is minimized, to recalculate the least cost formulation when the cost of the at least two inventory lots does not fall within the generated cost range.

11. The system of claim 10, wherein the database stores data generated by an Enterprise Resource Planning system.

12. A non-transitory computer readable medium having instructions stored thereon that, when executed by a processor, causes the processor to:
- receive a formulation specification, wherein the formulation specification comprises a plurality of ingredients for a product and technical requirements;
- receive cost information for the ingredients;
- receive inventory information for the ingredients;
- generate a least cost formulation for the product based on the formulation specification, cost information and inventory information;
- minimize a linear function, wherein the minimized linear function comprises a plurality of quantities for a plurality of ingredients;
- fetch at least two inventory lots for each quantity in order to form each quantity, wherein the at least two inventory lots have an associated cost that is based on a purchase date;
- determine whether the cost of the at least two inventory lots falls within a generated cost range;
- verify that technical attributes of the at least two inventory lots match the technical requirements of the formulation specification;
- after the linear function is minimized, recalculate the least cost formulation when the technical attributes of the at least two inventory lots do not match the technical requirements of the formulation specification; and
- after the linear function is minimized, recalculating, at the server, the least cost formulation when the cost of the at least two inventory lots does not fall within the generated cost range.

13. A non-transitory computer readable medium having instructions stored thereon that, when executed by a processor, causes the processor to:
- receive a formulation specification, wherein the formulation specification comprises a plurality of ingredients for a product, alternative ingredients for the product and characteristics of the product;
- receive cost information for the ingredients from an Enterprise Resource Planning system;
- receive inventory information for the ingredients from the Enterprise Resource Planning system;
- generate a least cost formulation for the product based on the formulation specification, cost information and inventory information;
- minimize a linear function, wherein the minimized linear function comprises a plurality of quantities for a plurality of ingredients;
- fetch at least two inventory lots for each quantity in order to form each quantity, wherein the at least two inventory lots have an associated cost it that is based on a purchase date;
- determine whether a cost of the at least two inventory lots falls within a generated cost range;
- verify that technical attributes of the at least two inventory lots match the characteristics of the product;
- after the linear function is minimized, recalculate the least cost formulation when the technical attributes of the at least two inventory lots do not match the characteristics of the product; and
- after the linear function is minimized, recalculating, at the server, the least cost formulation when the cost of the at least two inventory lots does not fall within the generated cost range.

* * * * *

UNITED STATES PATENT AND TRADEMARK OFFICE
CERTIFICATE OF CORRECTION

| | | |
|---|---|---|
| PATENT NO. | : 8,234,139 B2 | Page 1 of 1 |
| APPLICATION NO. | : 11/872448 | |
| DATED | : July 31, 2012 | |
| INVENTOR(S) | : Wan et al. | |

It is certified that error appears in the above-identified patent and that said Letters Patent is hereby corrected as shown below:

In column 2, line 44, delete "Cheddar," and insert -- cheddar, --, therefor.

In column 2, line 47, delete "Cheddar" and insert -- cheddar --, therefor.

In column 3, line 34-35, delete "Cheddar," and insert -- cheddar, --, therefor.

In column 6, line 16, delete "column above" and insert -- column e above --, therefor.

In column 14, line 42, delete "date Once" and insert -- date. Once --, therefor.

In column 18, line 37, in Claim 13, after "cost" delete "it".

Signed and Sealed this
Thirtieth Day of October, 2012

David J. Kappos
*Director of the United States Patent and Trademark Office*